May 8, 1962 T. A. PERLS ET AL 3,033,027

SINUSOIDAL PRESSURE GENERATOR

Filed Nov. 28, 1958

INVENTORS
THOMAS A. PERLS
DUANE O. MILES

By George C. Sullivan
Agent

United States Patent Office 3,033,027

Patented May 8, 1962

3,033,027

SINUSOIDAL PRESSURE GENERATOR

Thomas A. Perls, Los Altos, and Duane O. Miles, Sunnyvale, Calif., assignors to Lockheed Aircraft Corporation, Burbank, Calif.

Filed Nov. 28, 1958, Ser. No. 777,080
9 Claims. (Cl. 73—53)

Figures 1, 2, 3, 4, 5:
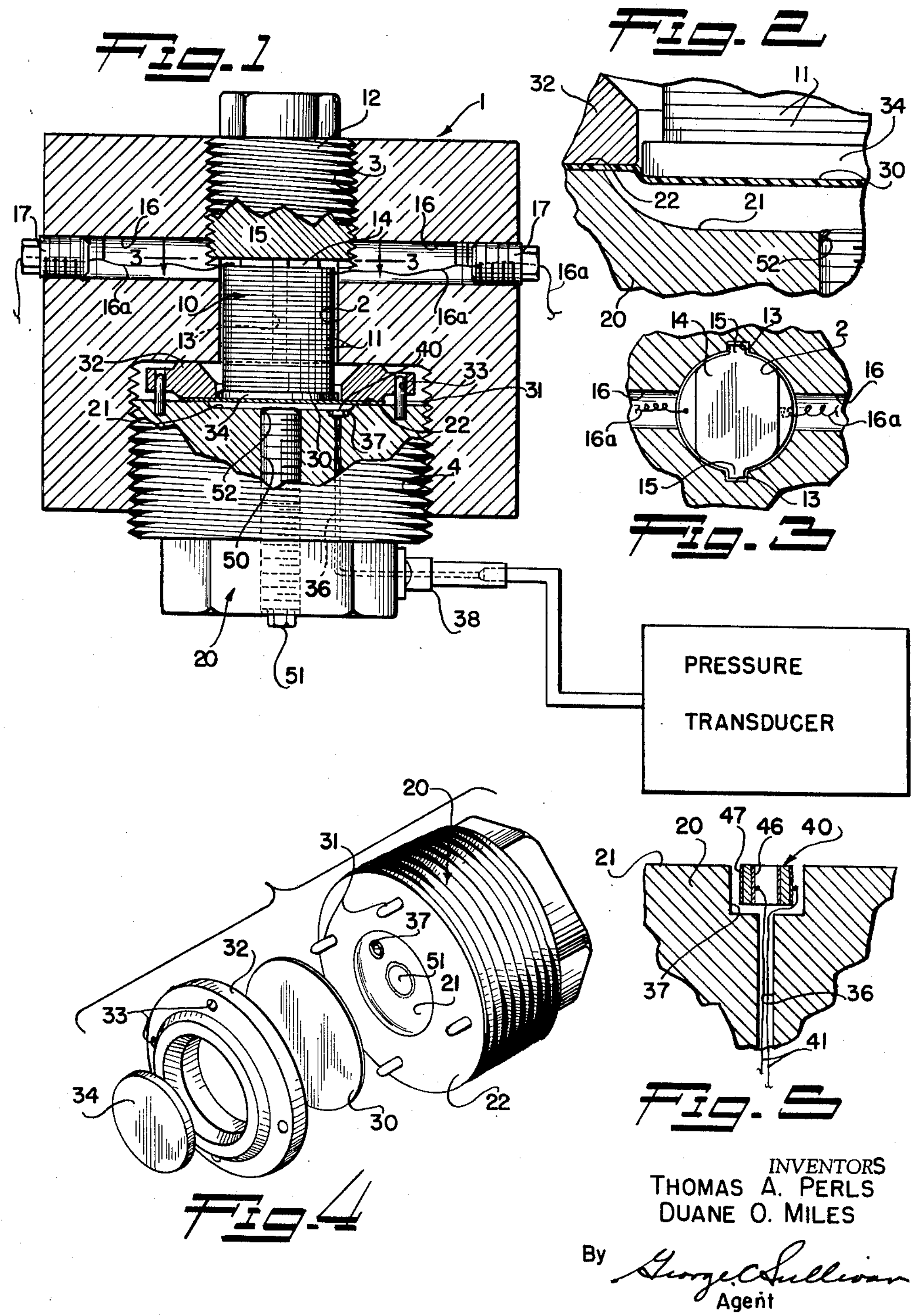

The necessity for development of a sinusoidal pressure generator capable of producing pressures of at least several pounds per square inch at frequencies ranging up to several hundred, and preferably several thousand cycles per second, has long been recognized. Such devices are utilized in determining and studying physical characteristics of various substances and are also useful in calibrating various types of instruments such as pressure gauges, microphones, and the like.

Early attempts at development of such a pressure generator resulted in the production of large and cumbersome equipment; for example, high intensity sirens which were limited in adaptability because of their physical structures whose large masses caused resonances to be set up in undesirable areas of the frequency ranges covered. In addition, the frequency range was narrow and the amplitude of pressure producible was small compared with modern requirements.

In recent years, the rapid advancement of the state-of-the-art in many fields has again raised operating and accuracy requirements and has created a need for a pressure wave-form generating device which is not satisfied by the aforementioned developments. For example, in connection with tests on solid propellant rockets, resonances are believed to exist at frequencies in the range of 700 to at least 10,000 c.p.s., and a sinusoidal pressure generator to cover this range and to produce pressures of approximately 100 p.s.i. has arisen.

It is therefore a primary object of this invention to provide an apparatus which will generate pressure and pressure changes of almost any desired wave shape, having frequency components in the range from zero to 10,000 c.p.s. or more.

A further object is to provide a wave form pressure generator capable of exerting a pressure of up to at least ten atmospheres peak to peak at any frequency within the above noted range.

An additional object is to provide such a generator of very small size resulting in elimination of many problems due to inherent resonances and to facilitate production of sinusoidal pressures over a wide range of both frequency and amplitude with a minimum of power input.

A still further object of this invention is to provide a sinusoidal pressure generator in which pressure is exerted upon a volume of fluid by a pressure exerting unit which is not in direct contact with said fluid and in which there is but a single fluid containing chamber, thus greatly reducing the opportunity for fluid to exude or leak from the device under high pressure.

Another object is to provide a sinusoidal pressure generator having a monitor or pick up element which is completely isolated from the pressure "driver" and from the leads extending therefrom.

With these and other objects in mind, reference will now be taken to the drawing wherein like numerals denote like parts throughout and in which, FIGURE 1 is an elevation view shown partly in section of a pressure generator constructed in accordance with the principles of the present invention, FIGURE 2 is an enlarged sectional view of the fluid chamber area shown overall in FIGURE 1, FIGURE 3 is a sectional view taken on line 3—3 of FIGURE 1, FIGURE 4 is an exploded view showing the manner in which the parts referred to in FIGURE 3 are assembled, and FIGURE 5 is a detail view, shown partly in section, of the monitor crystal.

Referring now more specifically to FIGURE 1, the sinusoidal pressure generator of the invention is shown to consist of a housing 1, preferably steel, having a passageway 2 extending substantially axially therethrough. This passageway 2 is provided at either end with enlarged chambers 3 and 4 which are threaded internally and which are connected through the central portion of the housing 1 by means of a driver containing section or pasageway 2, so-called because it is adapted to contain a driver element as described hereinbelow. It should be noted that although housing 1 is preferably formed of steel, other metals have been utilized to advantage in the practice of the invention including such substances as brass and tungsten.

The driver element referred to is denoted by number 10 and is formed of a material exhibiting piezoelectric characteristics when subjected to electric forces. In this preferred embodiment, the "driver" consists of a multiplicity (in this case 24) of thin wafers 11 which are arranged mechanically in series and electrically in parallel. These wafers are preferably barium titanate ($BaTiO_3$) ceramic and are commercially available. Certain additives are commonly used to improve the piezoelectric properties of $BaTiO_3$, and the present disclosure is intended to include the possible use of any suitable piezoelectric material, including piezoelectric materials not containing $BaTiO_3$. The piezoelectric property of the material causes it to change dimensions when an electric excitation is applied thereto and the degree of expansion and contraction is in proportion to the amount of voltage applied within $\pm 5\%$ from zero to 10,000 cycles per second. For certain applications in which proportionality of motion to applied voltage is not required, there may be advantages in the use of electrostrictive rather than piezoelectric materials. These are also commercially available and may be used in a "driver" configuration similar to the one described above.

Maintaining the driver stack 10 within and mechanically sealing one end of the passageway 2 is compression plug 12 which is threadably inserted within chamber 3. That portion of passageway 2 containing driver stack 10 has at least two keyway slots 13 extending substantially longitudinally within its wall. Positioned between compression plug 12 and driver stack 10 upon assembly is transmission disc 14 having keys or ears 15 extending from the outer periphery of the disc. These keys or ears 15 are received and slide within the keyway slots 13 in passageway 2 and serve to prevent the rotation of compression plug 12 from being transmitted to driver stack 10 as the former is tightened into contact with the latter.

Ducts 16 extend substantially radially from passageway 2 and serve to connect said passageway with the outside surface of the housing 1. When the driver stack 10 is positioned within housing 1 these ducts 16 serve as a means to connect the driver wires to an outside source of power. Wires *16a* extend through sleeve plugs 17 which are threadably received within the outer ends of ducts 16 and may serve to seal passageway 2 from external influences if such is desired. In such cases sleeve plugs 17 would hermetically seal the wires *16a* extending therethrough in any manner well known in the art.

Chamber 4, mentioned above, is preferably larger in diameter than chamber 3 and also is internally threaded to receive test plug 20 therein. Test plug 20, similar to compression plug 12 is provided with an octagonal or similarly shaped outer end to aid in attaching tightening devices to the member, and has a depression or cavity 21 formed substantially coaxially in its inner surface 22.

A thin membrane or diaphragm 30 of mylar or other flexible material completely covers and seals cavity 21 and extends over that part of surface 22 which immediately surrounds cavity 21. A plurality of guide pins 31 extend upwardly from the surface 22 of plug body 20 and serve to guide or position a diaphragm clamping ring 32 into juxtaposition with surface 22. Clamping ring 32, in the embodiment shown, has four apertures designated 33 which receive guide pins 31, and diaphragm 30 is clamped or positioned between clamping ring 32 and the inner surface 22 of plug 20.

Positioned between the inner end of the driver stack and diaphragm 30 is a pressure disc 34, preferably of steel, which provides a smooth flat surface bearing against the diaphragm 30. It should be noted that the diameter of pressure disc 34 is slightly less than the diameter of the aperture in diaphragm clamping ring 32. This difference is preferably less than the thickness of the diaphragm used in order to eliminate problems due to folding of the diaphragm between the two members.

Cavity 21 is filled with fluid which may advantageously be water, glycerine, or other material which is completely devoid of air or gas bubbles which would cause inaccuracies in the operation of the device. The only limitation on type of fluid used is that it must be non-reactive with the diaphragm material and surrounding housing and can, if necessary, be electrically conductive in nature.

In practice, cavity 21 is filled with a fluid which has been under vacuum for a time so as to reduce the amount of gas dissolved therewithin.

A passage or duct 36 connects the outer surface of test plug 20 with the indentation 37 in the bottom surface of cavity 21. This indentation may be of any desired size governed by the size of a transducer monitor element which it may be desirable to insert within said indentation. The duct 36 may be used to transmit fluid pressure directly or may preferably serve as a passage for wires leading to a crystal or other type monitor adapted to be placed in indentation 37. In the preferred embodiment this monitor is a hollow cylindrical or tubular ceramic crystal 40 of the same type as driver stack 10 and is very small compared with the size of stack 10. Elements suitable for such use are available in sizes as small as 1/16 inch diameter by 1/16 inch high or less. In this position monitor crystal 40, if used, is completely isolated from disrupting electrical influences from the driver stack and its leads. (A non-conducting liquid is required when this type of monitor is to be used.) In the preferred embodiment shown, this crystal pick-up element is coated on its inner and outer surfaces 46 and 47 with silver or other conductive paint and the electric connecting wires 41 are secured to this coating.

Also located within test plug 20 is means for mounting a larger transducer or other device which it may be desired to calibrate. Thus, numeral 50 denotes a threaded port in test plug 20 which is adapted to maintain a similarly threaded transducer element (not shown) therein. When no such device is included in the operating assembly, a filler plug 51 may be inserted in the port 50, the inner end of the plug 51 being substantially flush with the inner surface of the depression or cavity 21. In practice the seam or groove 52 presented between the surface of the filler plug 51 or transducer device, as the case may be, is sealed by dripping a small amount of potting or sealing resin therein which forms a sealing bead between the two aforementioned surfaces.

*Operation*

The test plug 20 is filled with fluid in the aforementioned manner, diaphragm 30 is secured over the cavity by clamping ring 32 and test plug assembly 20 is then inserted into housing 1. A transducer or other metering device shown schematically in the drawing is connected to test plug 20 through the fitting indicated generally at 38. The remainder of the device is then assembled by placing the driver stack 10 within passageway 2 and arranging leads 16*a* to connect with an outside electrical source (not shown) through plugs 17. Keyed transmission disc 14 is inserted into passageway 2 in contact with the outer end of driver stack 10 and is maintained in such position by the insertion of compression plug 12 into chamber 3. It should be obvious that if a smaller, or shorter, driver stack is used, more of the discs 14 could be provided to serve as shims to compensate for the size difference. A suitable amount of pre-compression is applied by means of compression plug 12.

When an electric current or voltage is applied across the driver stack leads, this member expands and contracts in accordance with the excitation applied and in turn exerts a pressure upon the fluid in cavity 21 through pressure disc 34 and diaphragm 30. Manifestly the pressure exerted on the fluid will vary according to the particular nature of wave form, frequency, and amplitude of the exciting current.

Thus a pressure generator device has been provided which exerts a variable pressure upon a fluid with the driver stack or element 10 being completely out of direct contact with the compressed fluid.

Because the driver crystals are not in the area where fluid pressures and resonances occur, these phenomena do not restrict the size of this stack. Piezoelectric ceramic crystals of the type utilized have the decided property of contracting radially as their longitudinal dimension increases as excitation is applied. Obviously this property would reduce the available volume change if the stack were immersed in the pressurized fluid. However, these difficulties are not encountered in use of this invention as only the longituidnal change in dimension is utilized in exerting pressure on the fluid cavity.

While a certain preferred embodiment of the invention has been specifically disclosed, it should be understood that the invention is not limited thereby as many variations will be readily apparent to those skilled in the art, and the invention is to be given the broadest interpretation within the terms of the following claims.

What we claim is:

1. A wave-form pressure generator comprising a housing, a body of electrically non-conducting fluid sealed within said housing, a piezoelectric driver element mounted in said housing with an end surface thereof mechanically connected in indirect series with said body of fluid, metering means connected with said fluid for metering pressure applied thereto, means in said housing for optionally maintaining an instrument to be calibrated in direct contact with said body of fluid, and a test plug threadably inserted into said housing, said test plug being formed with a cavity in the inner surface thereof in which said fluid is contained.

2. A wave form pressure generator comprising a housing, a test plug threadably inserted in said housing, said test plug being formed with a sealed cavity in the inner surface thereof, liquid completely filling said cavity, a piezoelectric element mounted in said housing opposite said test plug with a first surface thereof mechanically connected in indirect series with the liquid in said cavity, compression means connected to said housing for exerting force against a second surface of said piezoelectric element, and means connected with said liquid for metering pressure exerted thereupon.

3. A wave-form pressure generator as claimed in claim 2 in which said housing is provided with a passageway in substantial alignment with the liquid-filled cavity in said test plug, at least two grooves extending longitudinally in the wall of said passageway, a transmission disc in said passageway, ears on said transmission disc keyed into said grooves, one surface of said transmission disc in direct contact with said second surface of said piezoelectric element, and said compression means comprises a compression plug threadably inserted into said housing bearing against the opposite surface of said transmission disc.

4. A wave-form pressure generator as claimed in claim 3 in which said piezoelectric element consists of a plurality of wafers arranged mechanically in series and electrically in parallel.

5. A wave-form pressure generator as claimed in claim 2 in which said test plug is formed with a sealable duct connected to said cavity and adapted to contain a transducer monitor crystal, a thin, flexible diaphragm extending over said liquid-filled cavity, and a clamping ring having a large central aperture positioned between said housing and said diaphragm.

6. A wave-form generator as claimed in claim 5 in which a pressure disc is positioned in said central aperture between said diaphragm and said first surface of said piezoelectric element.

7. A wave-form generator as claimed in claim 6 including a plurality of guide pins extending normally from the inner surface of said test plug, said clamping ring being formed with a plurality of small apertures located near the periphery thereof, said apertures receiving said guide pins to properly position said clamping ring with respect to said test plug.

8. A wave-form pressure generator comprising a housing having a passageway extending therethrough and terminating at at least one end in an enlarged chamber, said housing being formed with at least one duct connecting said passageway with the outer surface of said housing, a piezoelectric element moveably positioned in said passageway with its electrical leads extending without said housing through said duct, the walls of said passageway being formed with at least two parallel, longitudinal grooves, a pressure transmission disc having at least two peripheral ears in said passageway adjacent the outer surface of said piezoelectric element, said ears being received in said grooves in said passage wall, a compression plug threadably inserted within said passageway with the inner surface thereof in pressure exerting relation against the outer side of said transmission disc, a test plug threadably received in said passageway at the opposite end thereof from said compression plug, said test plug being formed with a cavity in the inner surface thereof, fluid completely filling said cavity, a sealable metering duct connecting said cavity with the exterior of said housing, a plurality of guide pins normally extending from the inner surface of said test plug, a clamping ring keyed onto said guide pins, said clamping ring having an aperture in substantial alignment with said cavity, a flexible diaphragm covering said cavity and extending between said test plug and said clamping ring, a pressure disc positioned in the aperture in said clamping ring between said diaphragm and the inner surface of said piezoelectric element, said test plug being provided with a sealable port adapted to optionally receive an instrument to be calibrated, said port extending from a bottom surface of said cavity to the exterior of said housing.

9. A wave-form pressure generator as claimed in claim 8 in which the thickness of said diaphragm is not less than the distance between the inner periphery of the aperture in said clamping ring and the outer periphery of said pressure disc.

References Cited in the file of this patent

UNITED STATES PATENTS

| | | |
|---|---|---|
| 2,448,365 | Gillespie | Aug. 31, 1948 |
| 2,490,452 | Mason | Dec. 6, 1949 |
| 2,507,770 | Claassen | May 16, 1950 |
| 2,539,418 | Grogan | Jan. 30, 1951 |
| 2,574,475 | Grogan | Nov. 13, 1951 |

OTHER REFERENCES

Article entitled, "Direct Measurement of Dynamic Bulk Modulus," NBS Technical News Bulletin, vol. 40, No. 8, pages 110–111, August 1956, classified 73–53.